United States Patent
Harris et al.

(10) Patent No.: US 7,147,158 B2
(45) Date of Patent: Dec. 12, 2006

(54) SYSTEMS AND METHODS FOR PROVIDING MULTIPLE OBJECT PLANES IN AN OPTICAL IMAGE SCANNER

(75) Inventors: Rodney C. Harris, Fort Collins, CO (US); Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 10/370,430

(22) Filed: Feb. 20, 2003

(65) Prior Publication Data

US 2004/0164164 A1    Aug. 26, 2004

(51) Int. Cl.
*G06K 7/10* (2006.01)

(52) U.S. Cl. .................. 235/454; 358/443; 358/474; 358/494

(58) Field of Classification Search ............ 235/454; 358/443, 474, 494, 1.2, 451
See application file for complete search history.

(56) References Cited

U.S. PATENT DOCUMENTS

| | | | |
|---|---|---|---|
| 4,059,756 A | 11/1977 | Wilwerding | |
| 4,225,215 A | 9/1980 | Cojan | |
| 4,831,458 A * | 5/1989 | Watanabe | 358/443 |
| 5,089,901 A * | 2/1992 | Kaneko | 358/474 |
| 5,210,398 A | 5/1993 | Metlitsky | |
| 5,278,677 A | 1/1994 | Lee et al. | |
| 5,362,958 A | 11/1994 | Ando | |
| 5,446,276 A * | 8/1995 | Iyoda et al. | 250/208.1 |
| 5,450,157 A | 9/1995 | Rees | |
| 5,453,784 A | 9/1995 | Krishnan et al. | |
| 5,579,146 A | 11/1996 | Hsiao | |
| 5,616,909 A | 4/1997 | Arackellian | |
| 5,736,738 A | 4/1998 | Movaghar et al. | |
| 5,742,326 A | 4/1998 | Matsui et al. | |
| 5,756,981 A | 5/1998 | Roustaei et al. | |
| 5,786,582 A | 7/1998 | Roustaei et al. | |
| 5,878,152 A | 3/1999 | Sussman | |
| 5,883,727 A | 3/1999 | Tsai | |
| 5,898,171 A | 4/1999 | McConica et al. | |
| 5,923,042 A * | 7/1999 | Mietta et al. | 250/559.06 |
| 5,998,786 A | 12/1999 | Movaghar et al. | |
| 6,037,968 A | 3/2000 | Emge et al. | |
| 6,123,261 A | 9/2000 | Roustaei | |

(Continued)

FOREIGN PATENT DOCUMENTS

EP    0946040    9/1999

(Continued)

OTHER PUBLICATIONS

Translation of Office Action dated Dec. 9, 2003.

(Continued)

*Primary Examiner*—Karl D. Frech (57) ABSTRACT

Systems and methods for providing multiple object planes in an optical image scanner are provided. One embodiment is an optical head configured to scan an object, comprising a rod-lens array positioned to focus light reflected off the document, an optical sensor array for receiving light focused through the rod-lens, and a reflective surface variably positioned relative to the rod-lens array for reflecting light from the object to the rod-lens array. Another embodiment comprises a method for providing multiple object planes in an optical image scanner comprising positioning an optical head relative to a platen to locate a primary focal point of a rod-lens array at a first object plane and adjusting the position of an optical sensor array relative to the rod-lens array to relocate the primary focal point of the rod-lens array at a second object plane.

16 Claims, 10 Drawing Sheets

U.S. PATENT DOCUMENTS

| | | |
|---|---|---|
| 6,163,387 A | 12/2000 | Han |
| 6,188,465 B1 | 2/2001 | Rees et al. |
| 6,233,063 B1 | 5/2001 | Bernasconi et al. |
| 6,347,163 B1 | 2/2002 | Roustaei |
| 6,385,352 B1 | 5/2002 | Roustaei |
| 6,399,937 B1 | 6/2002 | Huang et al. |
| 6,438,271 B1 | 8/2002 | Usami et al. |
| 6,522,428 B1 | 2/2003 | Chiu et al. |
| 2002/0092967 A1 | 7/2002 | Matsumoto |

FOREIGN PATENT DOCUMENTS

| | | |
|---|---|---|
| EP | 1003323 | 5/2000 |
| JP | 63222573 | 9/1988 |
| JP | 11341219 | 12/1999 |
| JP | 2002225340 A * | 8/2002 |

OTHER PUBLICATIONS

UK Search Report, mailed Jul. 15, 2004, 3 pgs.

* cited by examiner

SYSTEMS AND METHODS FOR PROVIDING MULTIPLE OBJECT PLANES IN AN OPTICAL IMAGE SCANNER

BACKGROUND

Optical image scanners, also known as document scanners, convert a visible image (e.g., on a document or photograph, an image in a transparent medium, etc.) into an electronic form suitable for copying, storing, or processing by a computer. An optical image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices (e.g., a charge-coupled device, complimentary metal-oxide semiconductor (CMOS), etc.). Transparency image scanners pass light through a transparent image, for example a photographic positive slide, through optics, and then onto an array of photosensitive devices. The optics focus at least one line, called a scanline, of the image being scanned, onto the array of photosensitive devices. The photosensitive devices convert received light intensity into an electronic signal. An analog-to-digital converter converts the electronic signal into computer readable binary numbers, with each binary number representing an intensity value.

There are two common types of optical image scanners. In a first type, a single spherical reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays (SLA) (available from Nippon Sheet Glass Co.), in which an array of rod-shaped lenses is used, typically with multiple photosensors receiving light through each individual lens.

Depth of focus refers to the maximum distance that the image position may be changed while maintaining a certain image resolution (i.e., the amount by which an object plane may be shifted along the optical path with respect to some reference plane and introduce no more than a specified acceptable blur). The depth of focus for lens arrays is typically relatively short in comparison to scanners using a single spherical reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.7–1.5 mm above the surface of the platen. As a result, slides may be slightly out of focus when using lens arrays that are focused at the surface of the platen. Another example is scanning books or magazines where part of a page being scanned curves into a binding spline, causing part of the surface being scanned to be positioned above the transparent platen. A large depth of focus is needed to sharply image the binding spline.

SUMMARY

Embodiments of the present invention provide systems and methods for providing multiple object planes in an optical image scanner.

One embodiment is an optical image scanner comprising a platen and an optical head configured to scan. The optical head comprises a rod-lens array positioned to focus light reflected off a document and an optical sensor array variably positioned relative to the rod-lens array to receive light focused through the rod-lens array.

Another optical image scanner comprises a platen and an optical head configured to scan. The optical head comprises a rod-lens array positioned to focus light reflected off a document and an optical sensor array for receiving light focused through the rod-lens array and a reflective surface variably positioned relative to the rod-lens array for reflecting light from the document to the rod-lens array.

Another embodiment comprises a method for providing multiple object planes in an optical image scanner comprising positioning an optical head relative to a platen to locate a primary focal point of a rod-lens array at a first object plane and adjusting the position of an optical sensor array relative to the rod-lens array to relocate the primary focal point of the rod-lens array at a second object plane.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Various exemplary embodiments of an optical image scanner according to the present invention will be described with respect to FIGS. 1–10. However, by way of introduction, it should be appreciated that systems and methods according to the present invention provide a means for scanning an image at multiple object planes without having to reposition an optical head relative to a platen. Instead of moving the optical head, various embodiments of the present invention provide multiple object planes by modifying the internal optics of the optical head. In this regard, the optical head may remain fixed relative to the platen, while the internal optics are configured to provide multiple object planes (i.e., primary focal point at various distance above the top surface of the platen). It should be appreciated, however, that in some embodiments of the present invention the optical head may also be repositioned to provide further flexibility and shifting object planes.

In general, an optical image scanner according to the present invention enables multiple object planes to be scanned by variably positioning a component within the optical head (e.g., an optical sensor array, a reflective surface, etc.) relative to a lens array to shift the object plane being scanned. For example, an optical sensor array may be variably positioned relative to the lens array. In this regard, the optical sensor array may be positioned relative to the lens array at a first location in order to scan a first object plane above the platen. In order to scan a different object plane above the platen, the optical sensor array may be repositioned (i.e., moved closer or farther away from the lens array). It will be appreciated with reference to the following description that, by increasing and/or decreasing the distance between the optical sensor array and the lens array, various object planes above the platen may be scanned. For example, an optical image scanner according to the present invention As a further example, in some embodiments a reflective surface (e.g., mirror, etc.) may be used to direct light reflected off the document being scanned through the lens array and/or towards the optical sensor array. In order to scan multiple object planes, the reflective surface may also be variably positioned relative to the lens array. It should be further appreciated that, by increasing and/or decreasing the distance between the reflective surface and the lens array, various object planes above the platen may be scanned. As described in more detail below, various mechanisms may be used to variably position the optical sensor array, reflective surface, etc. relative to the lens array.

Figure 1:
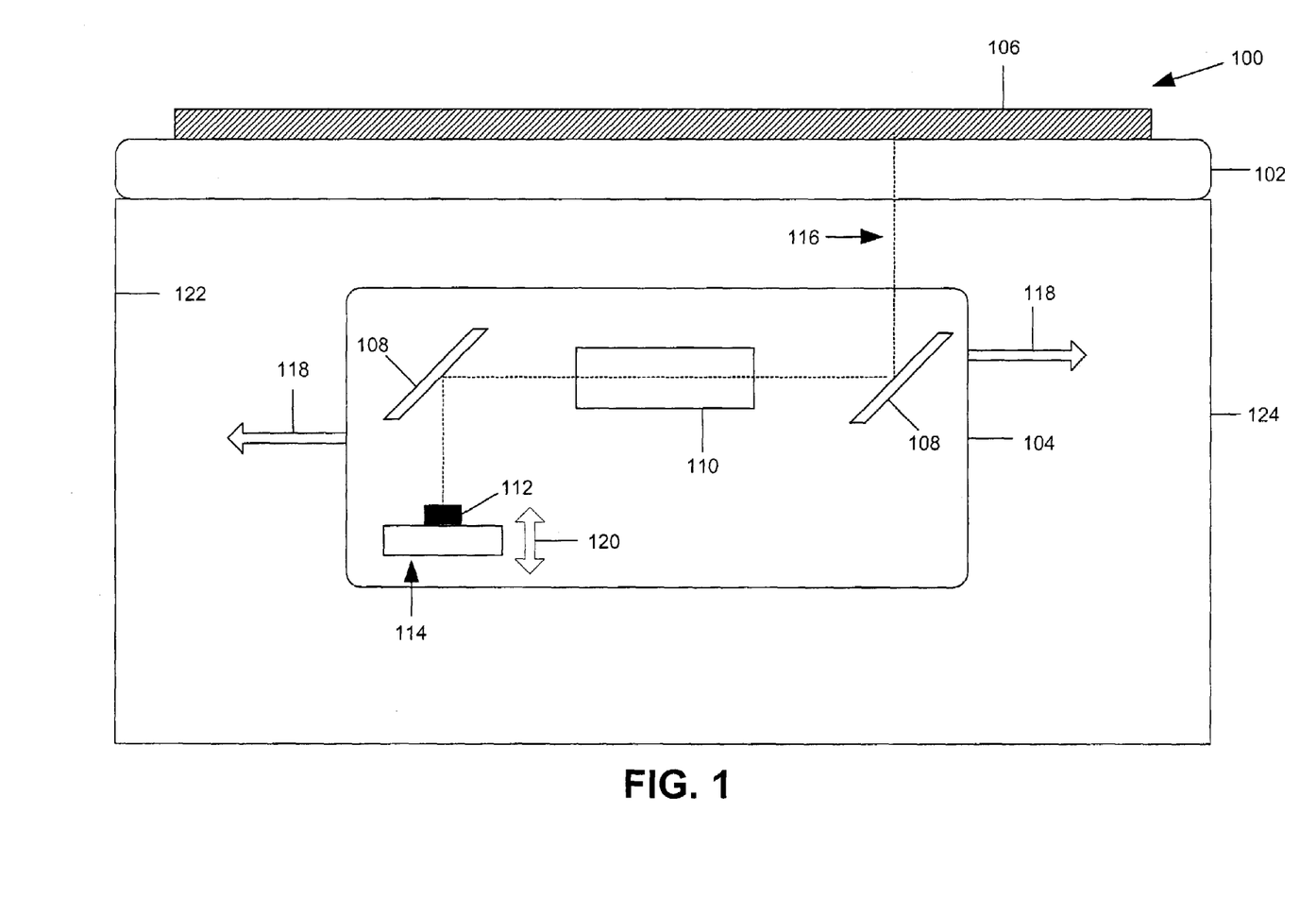
FIG. 1 is a cross-sectional view of an embodiment of an optical image scanner according to the present invention for providing multiple object planes to be scanned.

FIG. 1 is a cross-sectional view of an embodiment of an optical image scanner 100 according to the present invention for providing multiple object planes. The relative sizes of various objects in FIG. 1 are exaggerated to facilitate illustration. As shown in FIG. 1, optical image scanner 100 comprises an optical head 104 (also known as a carriage) positioned relative to a transparent platen 102. As known in the art, a document 106 may be placed on the top surface of the platen 102 for scanning. Optical image scanner 100 may be included within an optical image scanner (e.g., a low profile flatbed scanner), a facsimile machine, copier, etc.

As further illustrated in FIG. 1, optical head 104 comprises a first reflective surface 108 (e.g., mirror, etc.), a lens array 110, a second reflective surface 108, and an image sensor module 114. Image sensor module 114 may comprise, for example, a printed circuit assembly or any other semiconductor device. Image sensor module 114 also includes an optical sensor array 112, which may be any type of device configured to receive optical signals and convert the light intensity into an electronic signal. For example, as known in the art, optical sensor array 112 may comprise a charge-coupled device (CCD), complimentary metal-oxide semiconductor (CMOS), etc.

Lens array 110 may comprise an array of rod-shaped lenses which have a relatively short depth of focus. For example, lens array 110 may comprise a Selfoc® lens array (SLA), which is manufactured and sold by Nippon Sheet Glass Co. of Somerset, N.J. A rod-lens array may comprise at least one row of graded-index micro lenses, which may be equal in dimensions and optical properties. The lenses may be aligned between two fiberglass-reinforced plastic (FRP) plates. Because FRP has a coefficient of thermal expansion equal to glass, thermal distortion and stress effects is minimal. The FRP also increases mechanical strength of the SLA. The interstices may be filled with black silicone to prevent flare (crosstalk) between the lenses and protect each individual lens.

Figure 2:
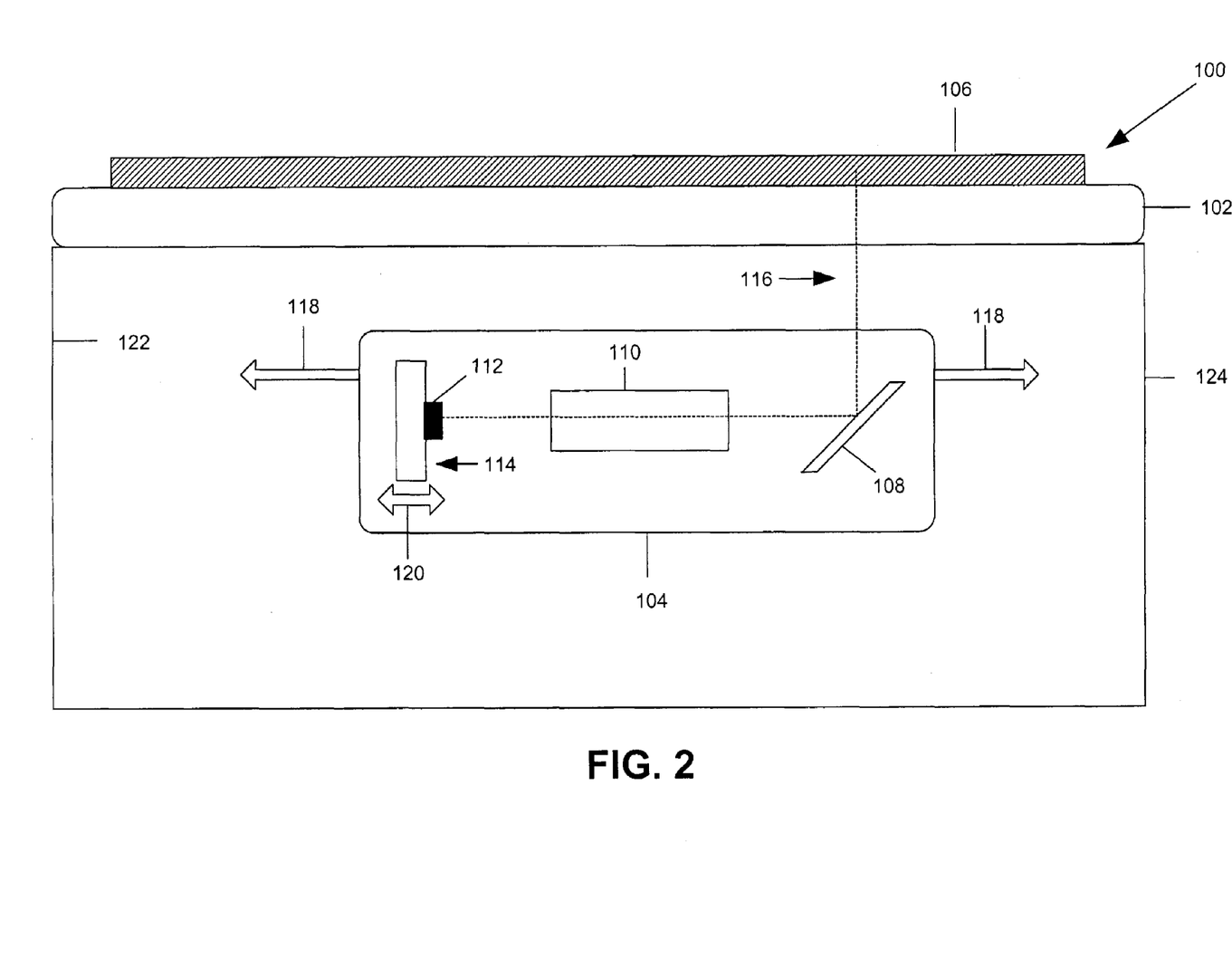
FIG. 2 is a cross-sectional view of another embodiment of an optical image scanner according to the present invention for providing multiple object planes to be scanned.

Referring again to FIG. 1, as a document 106 is being scanned by optical head 104, an optical signal along optical path 116 is reflected off the document 106 and towards the first reflective surface 108. The first reflective surface 108 directs the optical signal through the lens array 110 to be focused. The optical signal may also be reflected toward image sensor module 114 by a second reflective surface 108. The optical signal is received by optical sensor array 112 and converted into an electronic signal, which may be processed by an analog-to-digital converter, digital signal processor, etc. In this manner, the optics within optical head 104 focus a portion of an image of document 106 onto optical sensor array 112. As illustrated in FIG. 2, the second reflective surface 108 may be optional. For instance, in order to alter the cross-sectional profile of optical head 104, second reflective surface 108 may be removed and the image sensor module 114 may be oriented perpendicular to the optical axis of lens array 110 to receive optical signals along path 116. Alternatively, the optical axis of lens array 110 may be oriented perpendicular to platen 102 to direct light through lens array 110 and onto optical sensor array 112. The particular orientation of lens array 110 is not relevant to the present invention.

The optical components within optical head 104 focus at least one line (i.e., a scanline) of the image being scanned onto optical sensor array 112. As known in the art, scanning of the entire image may be accomplished by translating optical head 104 relative to document 106 (e.g., by using cables, toothed drive belts, rack and pinion, etc.) as indicated by reference number 118. As indicated by reference number 120 (FIGS. 1 and 2), optical sensor array 112 may be variably positioned relative to optical path 116. In the embodiment illustrated in FIG. 1, optical sensor array 112 may be variably positioned in a vertical axis. In the embodiment illustrated in FIG. 2, optical sensor array may be variably positioned along a horizontal axis.

As mentioned above, due to the relatively small depth of focus of lens array 110, existing optical image scanners may produce blurred images of documents 106 that are positioned a small distance above the primary focal point of lens array 110. For example, existing optical image scanners may be configured with the primary focal point at a relatively short distance $H_0$ above the top surface of platen 102. When a document 106, such as a sheet of paper, etc. is positioned on platen 102, it may be located approximately the distance Ho above the top surface of platen 102 or within the small range of the depth of focus. However, if the document 106 is positioned at an object plane that is outside of a range of acceptable focus, existing optical image scanners may produce a blurred image. For instance, various types of documents (or portions of the document) may be located at an object plane outside of the range of acceptable focus when positioned on platen 102 (e.g., 35 mm slides, transparencies, photographs, books, magazines, etc.).

In this regard, various embodiments of optical image scanner 100 according to the present invention enable multiple object planes to be scanned by variably positioning one of the optical components located within optical head 104. Thus, optical image scanner 100 may generate focused images of various types of documents 106 positioned at multiple object planes.

Figure 3:
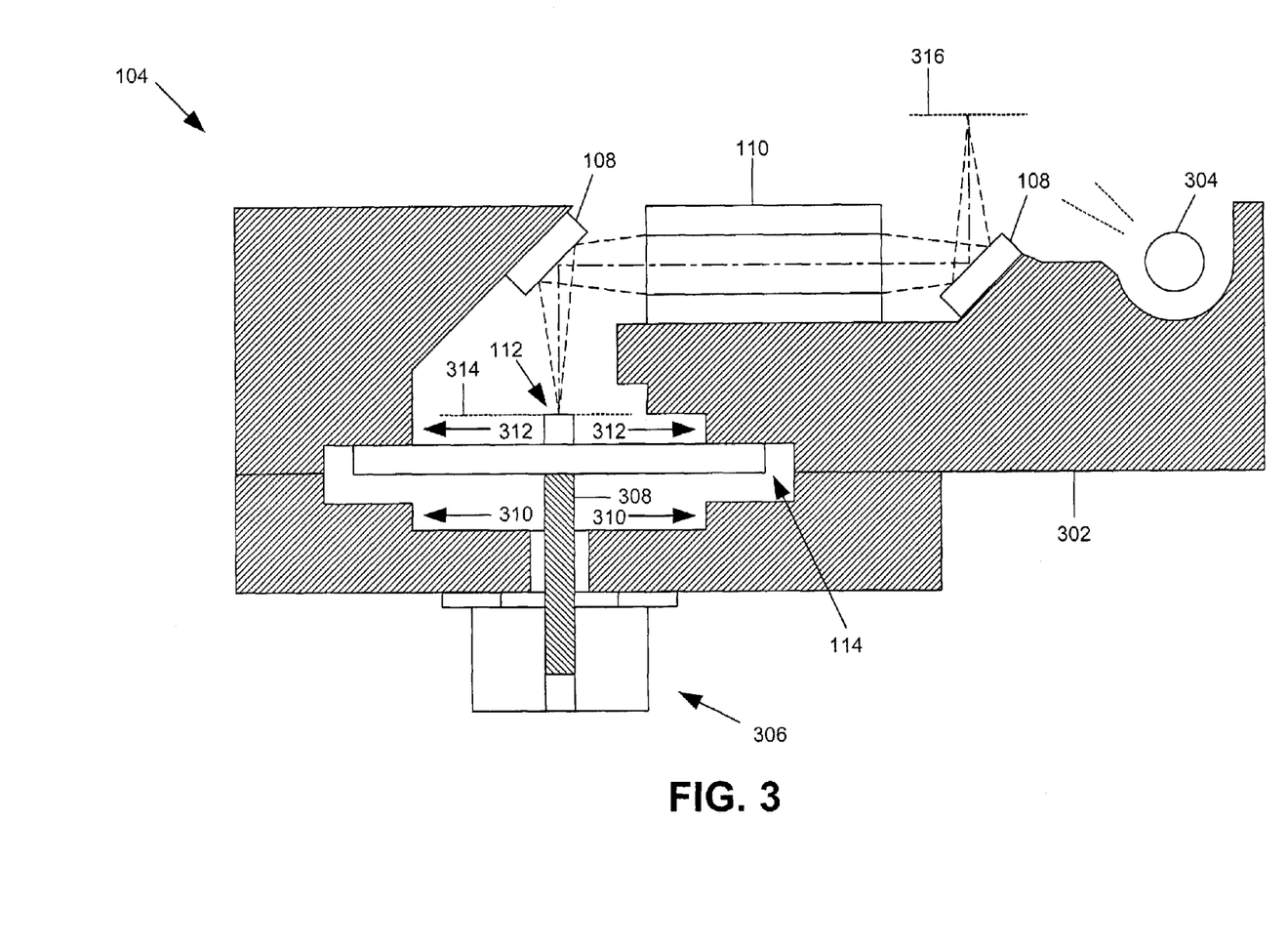
FIG. 3 is a cross-sectional view of an embodiment of an optical head such as shown in FIGS. 1 and 2 illustrating the image sensor module positioned by the actuator in an extended position.

As stated above, various mechanisms may be used to variably position the optical sensor array 112, reflective surface 108, etc. relative to the lens array 110. Referring to FIGS. 3–6, various exemplary embodiments for variably positioning optical sensor array 112 will be described. As illustrated in FIG. 3, optical head 104 comprises a housing 302 for supporting and/or containing the optical components (e.g., reflective surface 108, lens array 110, image sensor module 114, illumination source 304, etc.) and an actuator assembly 306. Image sensor module 114 is positioned within a recess of housing 302 defined by upper stop members 312 and lower stop members 310.

Figure 4:
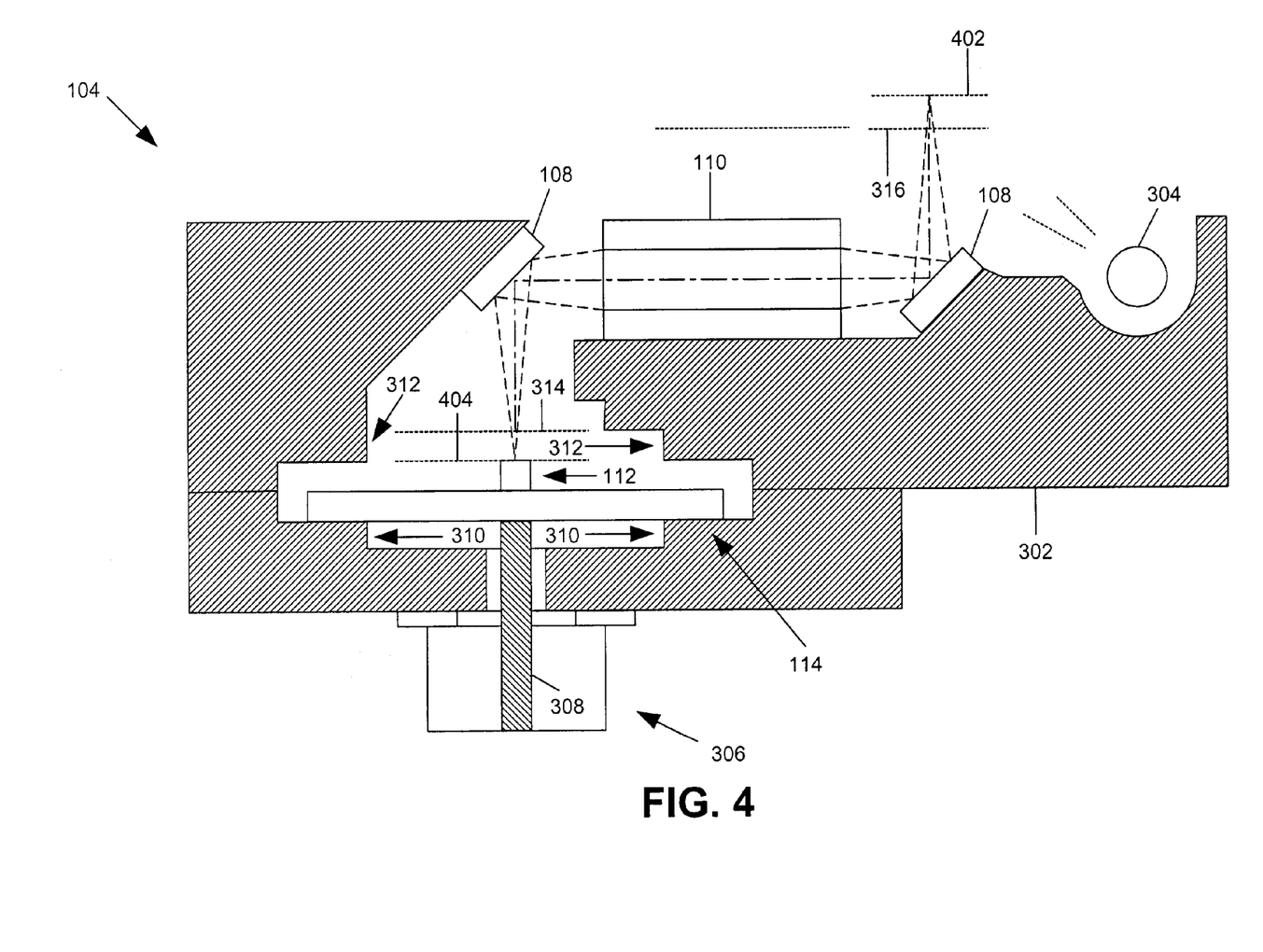
FIG. 4 is a cross-sectional view of the optical head of FIG. 3 illustrating the image sensor module positioned by the actuator in a retracted position.

Actuator assembly 306 may include an actuator shaft 308 that engages a lower surface of image sensor module 114. During operation, actuator shaft 308 is driven between an extended position (FIG. 3) and a retracted position (FIG. 4). For example, actuator shaft 308 may be driven vertically into upper stop members 312. As illustrated in FIG. 3, in the extended position, image sensor module 114 is positioned against upper stop members 312 such that optical sensor array 112 is located at an image plane 314, which corresponds to an object plane 316 located above platen 102. In other words, in the extended position, optical head 104 may be configured to scan object plane 316. As illustrated in FIG. 4, in the retracted position, image sensor module 114 is positioned against lower stop members 310 such that optical sensor array 112 is located at an image plane 404, which corresponds to an object plane 402 located a greater distance above platen 102. When optical sensor array 112 is located at image plane 404, optical head 104 is configured to scan object plane 402.

One of ordinary skill may art will appreciate that actuator assembly 306 may be configured in a variety of ways. For example, actuator assembly 306 may employ any type of slide mechanism and any type of drive mechanism. As known in the art, the slide mechanism may engage image sensor module 114 and the drive mechanism may be configured to extend and/or retract the slide mechanism to reposition image sensor module 114. In this regard, actuator assembly 306 may comprise any of the following, or other, types of mechanisms: a linear actuator, electric solenoid (linear or rotary), bail-screw, machine screw, cam assembly (with or without gear-train), electric drive motor, a positioning table, a rodless cylinder, electric thrust cylinder, etc.

It should be appreciated that image sensor module 114 may be variably positioned relative to lens array 110 in a number of alternative ways. In the embodiments illustrated in FIGS. 3 and 4, image sensor module 114 is linearly displaced along a vertical optical axis (i.e., incident to the optical axis). Alternatively, image sensor module 114 may also be variably positioned relative to lens array 110 by pivoting, rotating, hinging, etc. image sensor module 114.

Figure 5:
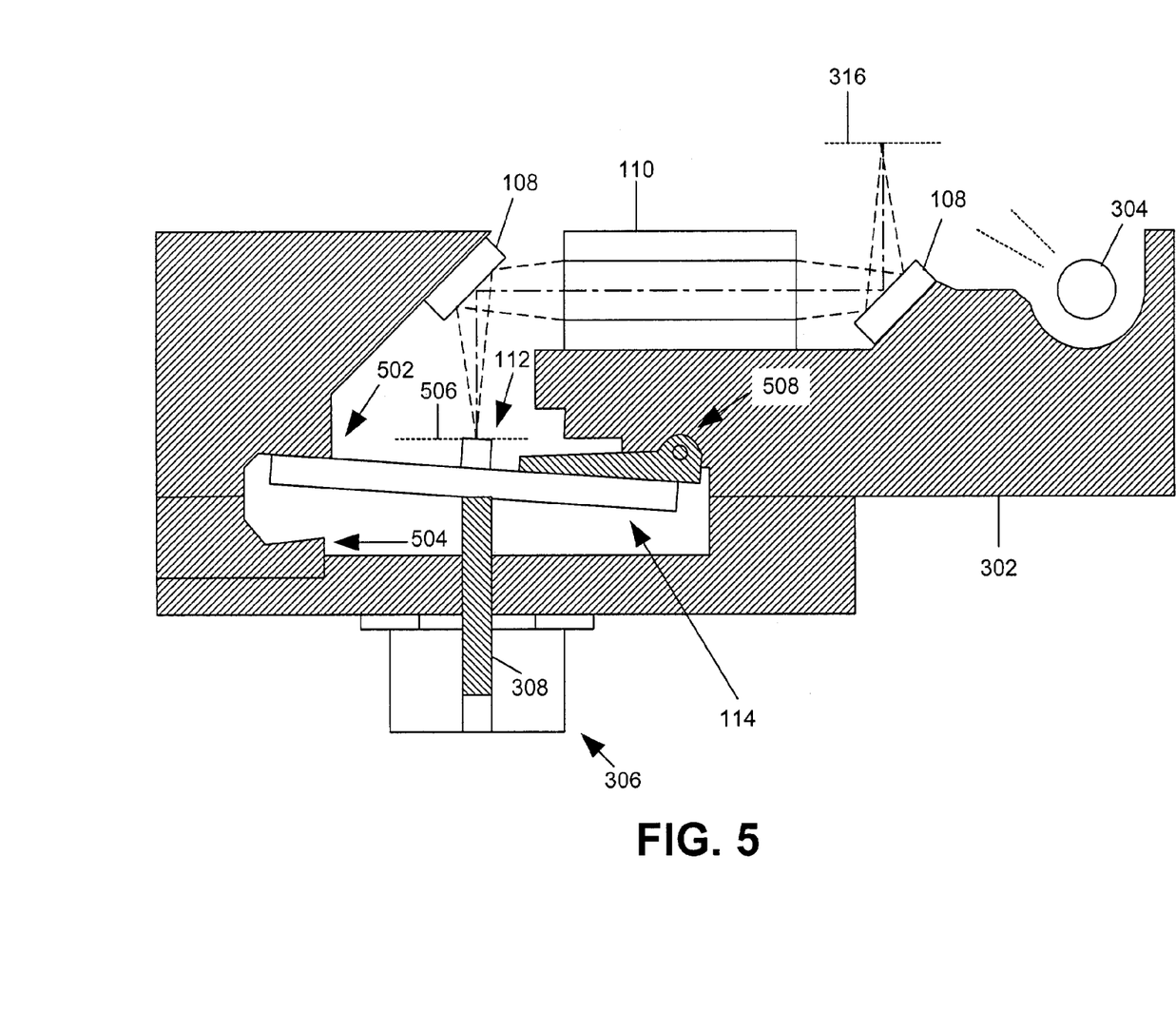
FIG. 5 is a cross-sectional view of another embodiment of an optical head such as shown in FIGS. 1 and 2 illustrating the image sensor module positioned by the actuator in an extended position.
Figure 6:
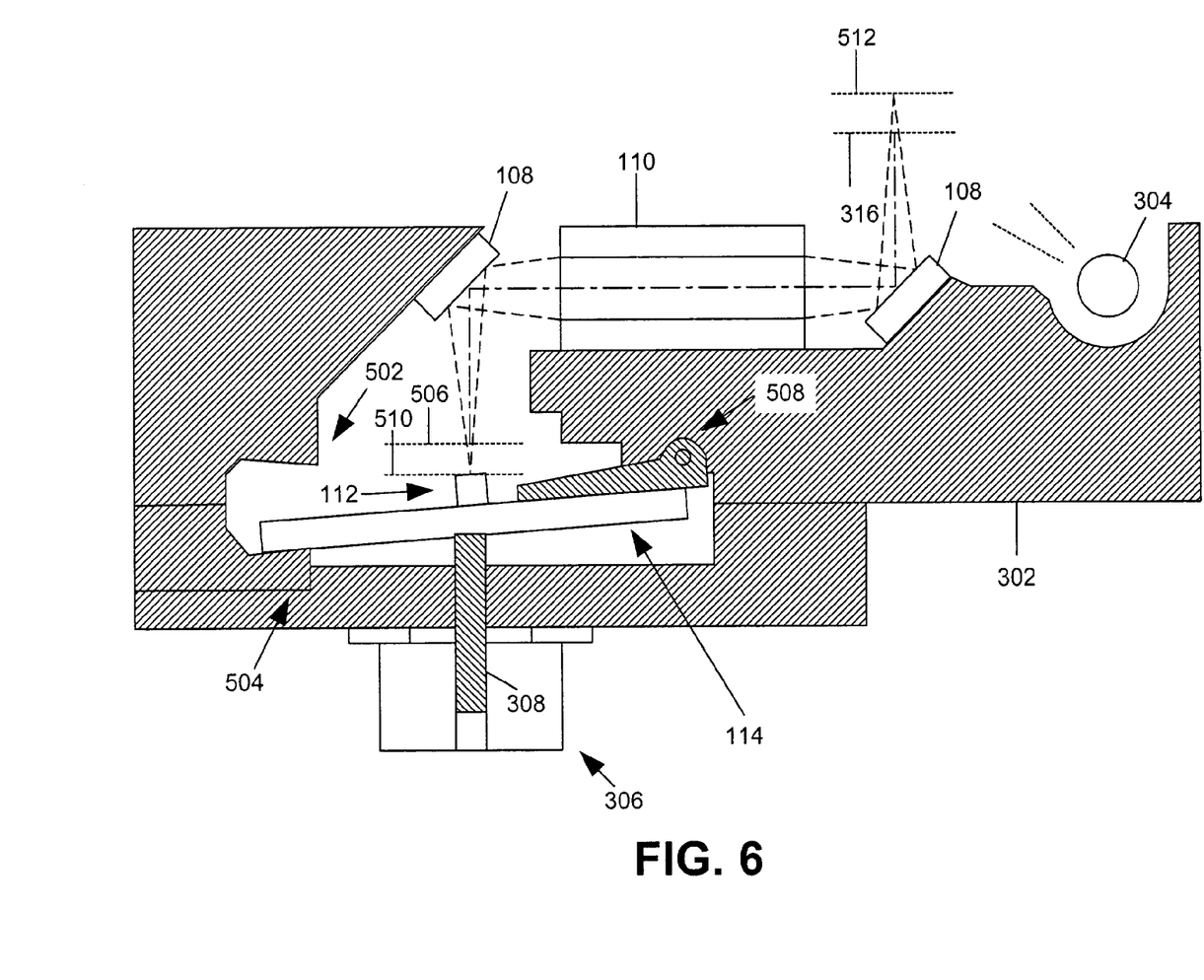
FIG. 6 is a cross-sectional view of the optical head of FIG. 5 illustrating the image sensor module positioned by the actuator in a retracted position.

In the embodiments illustrated in FIGS. 5 and 6, optical head 104 may further comprise a hinge 508 secured at a pivot point to housing 302. Hinge 508 is secured to image sensor module 114. For instance, a lower surface of hinge 508 may be attached to one of the sides of image sensor module 114. During operation, actuator shaft 308 is driven between an extended position (FIG. 5) and a retracted position (FIG. 6). As illustrated in FIG. 5, when actuator shaft 308 is extended, image sensor module 114 is driven upward. The upward force provided by actuator shaft 308 causes image sensor module 114 to rotate in a clockwise direction as hinge 508 pivots. The combination of actuator shaft 308 and hinge 508 forces the other side of image sensor module 114 against an upper stop member 502 in housing 306. In the extended position, image sensor module 114 may be positioned against upper stop member 502 such that optical sensor array 112 is located at an image plane 506, which corresponds to an object plane 316 located above platen 102. In other words, in the extended position, optical head 104 is configured to scan object plane 316.

Referring to FIG. 6, when actuator shaft 308 is retracted, image sensor module 114 is driven downward. The downward force provided by actuator shaft 308 causes image sensor module 114 to rotate in a counterclockwise direction as hinge 508 pivots. The combination of actuator shaft 308 and hinge 508 forces image sensor module 114 against a lower stop member 504 in housing 306. In the retracted position, image sensor module 114 may be positioned such that optical sensor array 112 is located at a lower image plane 510, which corresponds to an object plane 512 located a greater distance above platen 102. When optical sensor array 112 is located at image plane 510, optical head 104 may be configured to scan object plane 512

Figure 7:
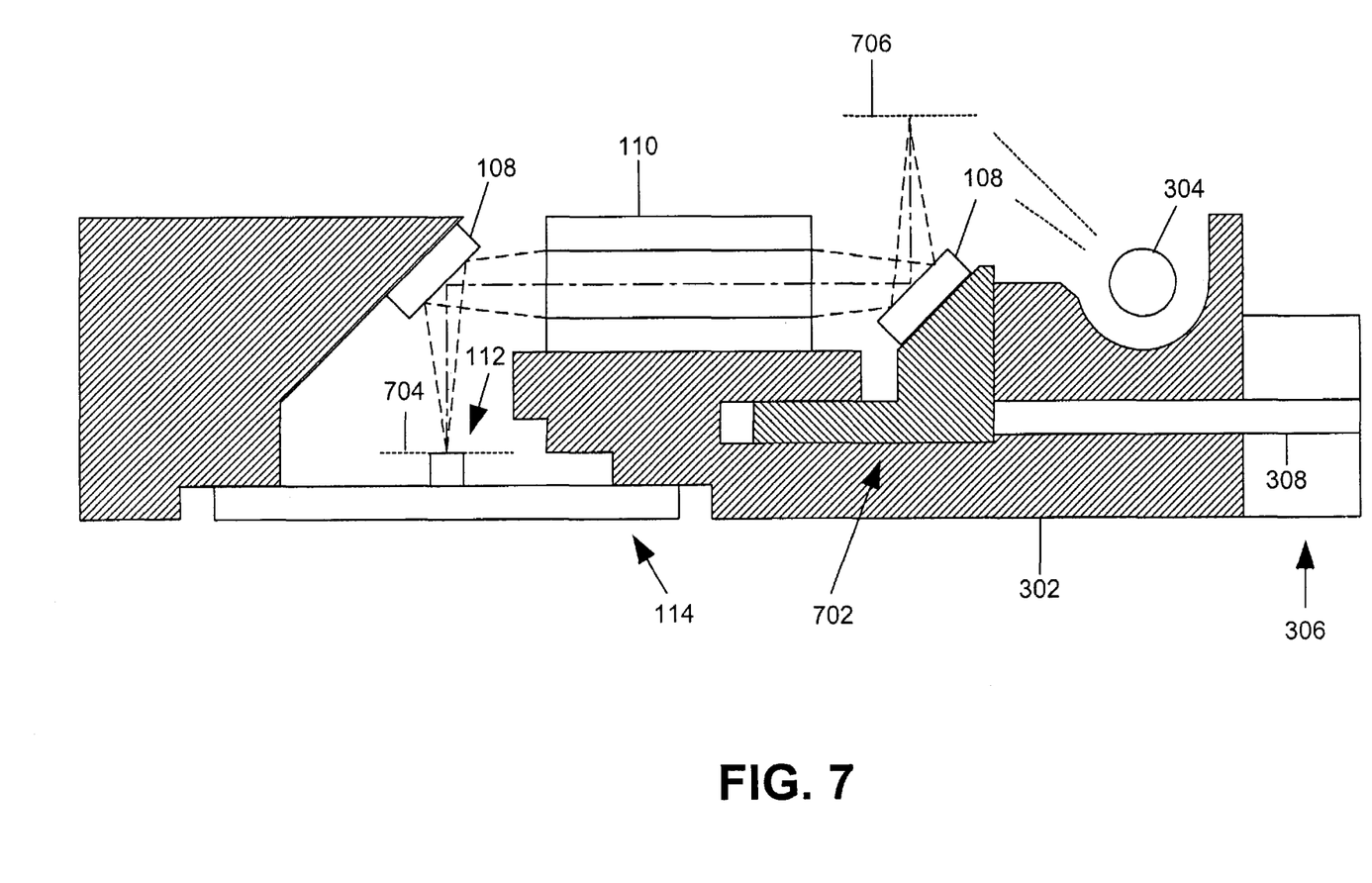
FIG. 7 is a cross-sectional view of another embodiment of an optical head such as shown in FIGS. 1 and 2 illustrating the reflective surface positioned by the actuator in a retracted position.

As mentioned above, multiple object planes above platen 102 may be provided by variably positioning one of the optical components within optical head 104 relative to lens array 110. Referring to FIGS. 7–10, various embodiments will be described in which a reflective surface 108 is variably positioned relative to lens array 110. In the embodiments illustrated in FIGS. 7 and 8, optical head 104 comprises a slide mount 702 on which a reflective surface 108 is attached. Slide mount 702 may be attached to an actuator shaft 308 of an actuator assembly 306. During operation, actuator shaft 308 may be driven between an extended position (FIG. 8) and a retracted position (FIG. 7). As illustrated in FIG. 7, in the retracted position, reflective surface 108 may be positioned relative to lens array 110 to define a first object plane 706 located a first distance above platen 102. In the retracted position, optical head 104 may be configured to scan object plane 706.

Figure 8:
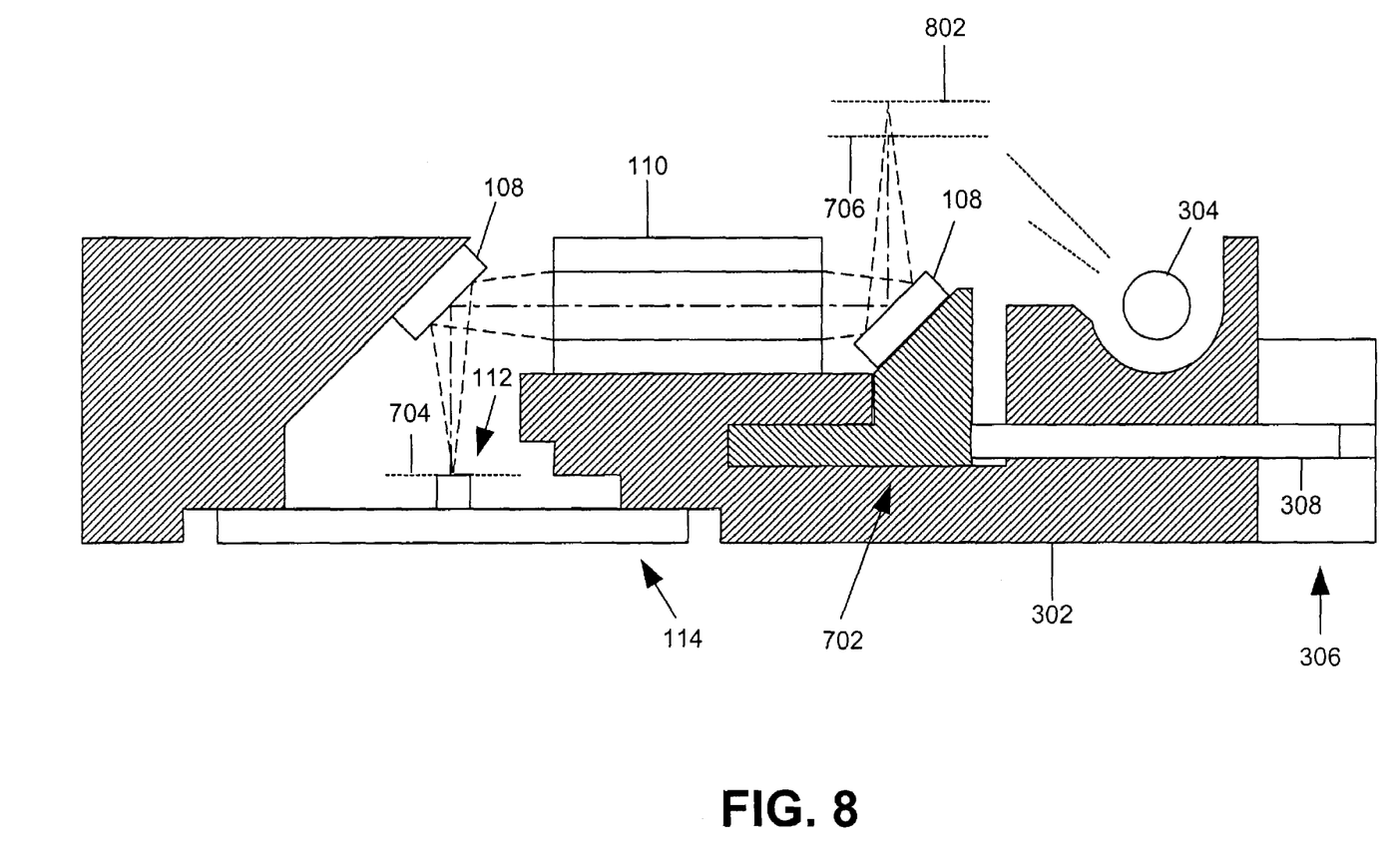
FIG. 8 is a cross-sectional view of the optical head of FIG. 7 illustrating the reflective surface positioned by the actuator in an extended position.

Referring to FIG. 8, in order to scan an object plane located a greater distance from platen 102, actuator assembly 306 may drive actuator shaft 308 to the extended position. In the extended position, reflective surface 108 is moved closer to lens array 110 along the optical axis. One of ordinary skill in the art will appreciate that, by moving reflective surface 108 closer to lens array 110, the object plane may be shifted to a greater distance from platen 102 (object plane 802). It should be further appreciated that the lateral movement of reflective surface 108 along the optical axis of lens array 110 also causes a corresponding lateral shift of the object plane. Therefore, as a document 106 is being scanned, optical image scanner 100 may accoung for the lateral shift of the object plane by laterally shifting optical head 104.

Figure 9:
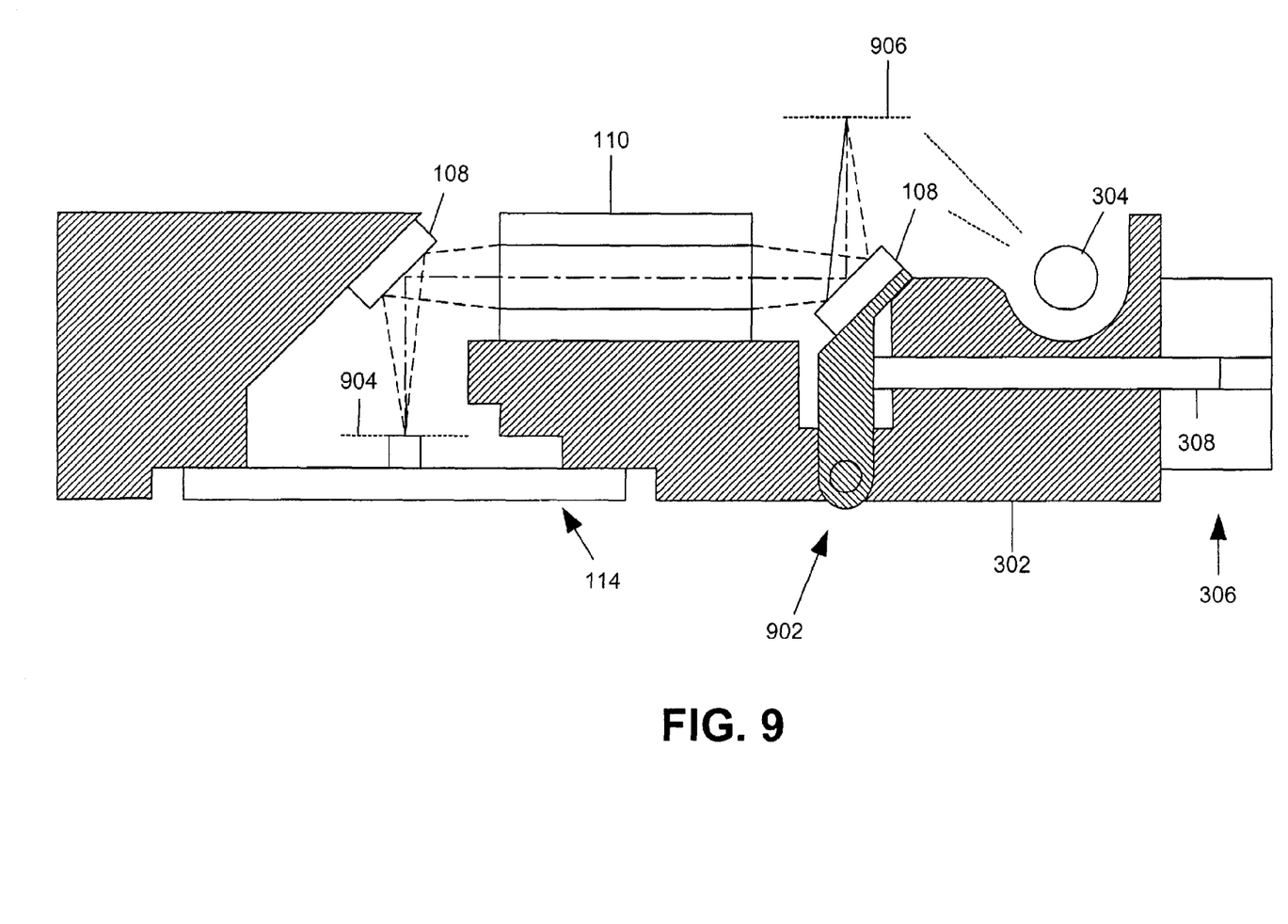
FIG. 9 is a cross-sectional view of a further embodiment of an optical head such as shown in FIGS. 1 and 2 illustrating the reflective surface positioned by the actuator in a retracted position.
Figure 10:
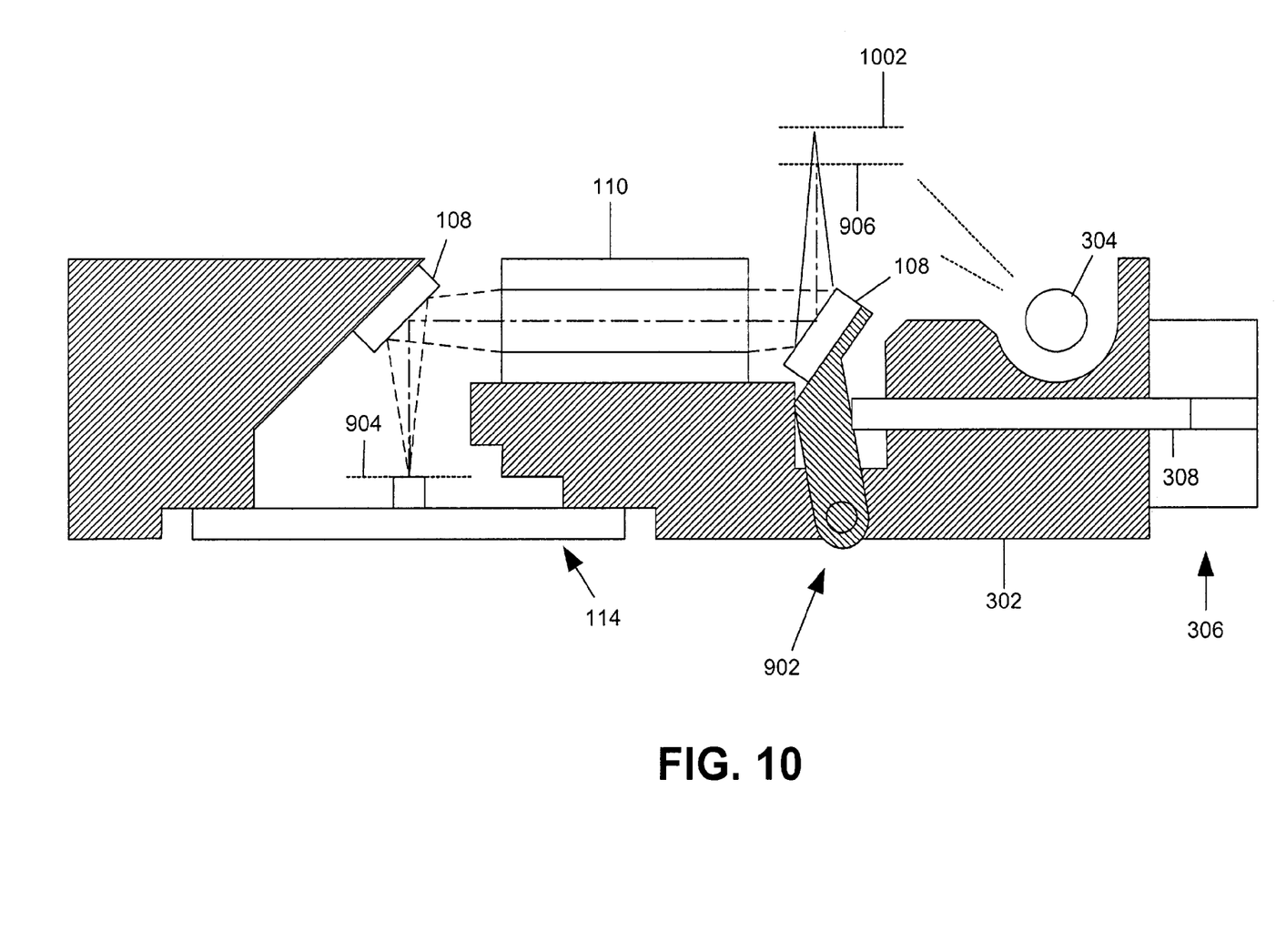
FIG. 10 is a cross-sectional view of the optical head of FIG. 9 illustrating the reflective surface positioned by the actuator in an extended position.

As illustrated in FIGS. 9 and 10, reflective surface 108 may be variably positioned relative to lens array 110 by a pivoting, rotating, hinging, etc. motion. For example, slide mount 702 may be replaced with a pivot mount 902. During operation, actuator shaft 308 may be driven between an extended position (FIG. 10) and a retracted position (FIG. 9). As illustrated in FIG. 9, in the retracted position, reflective surface 108 may be positioned relative to lens array 110 to define a first object plane 906 located a first distance above platen 102. In the retracted position, optical head 104 may be configured to scan object plane 906.

Referring to FIG. 10, in order to scan an object plane located a greater distance from platen 102, actuator assembly 306 may drive actuator shaft 308 to the extended position. As pivot mount 902 is engaged by actuator shaft 308, pivot mount 902 rotates, pivots, hinges, etc. in a counterclockwise direction. In this manner, reflective surface 108 is moved closer to lens array 110. By moving reflective surface 108 closer to lens array 110, the object plane may be shifted to a greater distance from platen 102 (object plane 1002). It should be further appreciated that the lateral movement of reflective surface 108 along the optical axis of lens array 110 also causes a corresponding lateral shift of the object plane. Reflective surface 108 is also tilted in comparison to the retracted position due to the rotation, pivoting, hinging, etc. of pivot mount 902. Therefore, as a document 106 is being scanned, optical image scanner 100 may account for the lateral shift in the object plane by laterally shifting optical head 104.

The invention claimed is:

1. An optical image scanner comprising:
   a platen;
   an optical head configured to scan, the optical head comprising:
      a rod-lens array positioned to focus light reflected off an object to be scanned; and
      an optical sensor array variably positioned relative to the rod-lens array to receive light focused through the rod-lens array;
   a linear actuator configured to variably position the optical sensor array relative to the rod-lens array; and
   a hinge positioned to pivot the image sensor module.

2. The optical image scanner of claim 1, wherein the linear actuator comprises an actuator shaft that variably positions the optical sensor array.

3. The optical image scanner of claim 1, wherein the linear actuator comprises one of an electric solenoid, an electric drive motor, a positioning table, a rodless cylinder, and an electric thrust cylinder.

4. An optical head configured to scan an object comprising:
   a rod-lens array positioned to focus light reflected off the object;
   an optical sensor array for receiving light focused through the rod-lens array; and
   a reflective surface variably positioned relative to the rod-lens array for reflecting light from the object to the rod-lens array, wherein the reflective surface is positioned on a pivoting mount.

5. The optical head of claim 4, wherein the optical sensor array is variably positioned.

6. The optical head of claim 4, wherein the optical head further comprises a linear actuator configured to variably position the reflective surface relative to the rod-lens array.

7. The optical head of claim 6, wherein the linear actuator comprises an actuator shaft that variably positions the optical sensor array.

8. The optical head of claim 6, wherein the linear actuator comprises one of an electric solenoid, an electric drive motor, a positioning table, a rodless cylinder, and an electric thrust cylinder.

9. A method for providing multiple object planes in an optical image scanner, the method comprising:
   positioning an optical head relative to a platen to locate a primary focal point of a rod-lens array at a first object plane; and
   adjusting the position of an optical sensor array relative to the rod-lens array to relocate the primary focal point of the rod-lens array at a second object plane by pivoting the optical sensor array.

10. The method of claim 9, wherein the adjusting the position of an optical sensor array comprises extending a linear actuator.

11. The method of claim 9, wherein the adjusting the position of an optical sensor array comprises retracting a linear actuator.

12. The method of claim 9, wherein the adjusting the position of an optical sensor array comprises adjusting the position of an optical sensor array relative to the rod-lens array to relocate the primary focal point of the rod-lens array closer to the platen.

13. A method for providing multiple object planes in an optical image scanner, the method comprising:
   positioning an optical head relative to a platen to locate a primary focal point of a rod-lens array at a first object plane above the platen; and
   adjusting the position of a reflective surface relative to the rod-lens array to relocate the primary focal point of the rod-lens array at a second object plane above the platen by pivoting the reflective surface.

14. The method of claim 13, wherein the adjusting the position of a reflective surface comprises extending a linear actuator.

15. The method of claim 13, wherein the adjusting the position of a reflective surface comprises retracting a linear actuator.

16. The method of claim 13, wherein the adjusting the position of a reflective surface comprises adjusting the position of a reflective surface relative to the rod-lens array to relocate the primary focal point of the rod-lens array closer to the platen.

\* \* \* \* \*